United States Patent
Magai et al.

(10) Patent No.: US 8,842,917 B2
(45) Date of Patent: Sep. 23, 2014

(54) LOCAL FEATURE EXTRACTION APPARATUS, CONTROL METHOD THEREFOR, AND COMPUTER-READABLE MEDIUM

(75) Inventors: Koichi Magai, Tokyo (JP); Hirotaka Shiiyama, Yokohama (JP); Kazuyo Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 12/891,486

(22) Filed: Sep. 27, 2010

(65) Prior Publication Data

US 2011/0103697 A1 May 5, 2011

(30) Foreign Application Priority Data

Nov. 5, 2009 (JP) ................................. 2009-254446

(51) Int. Cl.
G06K 9/46 (2006.01)
(52) U.S. Cl.
CPC .................................. *G06K 9/4671* (2013.01)
USPC ........................................................ 382/195
(58) Field of Classification Search
None
See application file for complete search history.

(56) References Cited

U.S. PATENT DOCUMENTS

| 5,905,811 | A | 5/1999 | Shiiyama et al. | |
|---|---|---|---|---|
| 6,094,508 | A * | 7/2000 | Acharya et al. | 382/199 |
| 6,175,650 | B1 * | 1/2001 | Sindhu et al. | 382/171 |
| 6,404,920 | B1 * | 6/2002 | Hsu | 382/190 |
| 6,603,880 | B2 * | 8/2003 | Sakamoto | 382/173 |
| 6,691,126 | B1 * | 2/2004 | Syeda-Mahmood | 707/696 |
| 6,766,055 | B2 * | 7/2004 | Matsugu et al. | 382/173 |
| 6,804,683 | B1 * | 10/2004 | Matsuzaki et al. | 1/1 |
| 7,418,135 | B2 | 8/2008 | Shiiyama | |
| 8,146,814 | B2 * | 4/2012 | Mueller et al. | 235/385 |
| 8,224,031 | B2 * | 7/2012 | Saito | 382/104 |
| 2002/0164074 | A1 * | 11/2002 | Matsugu et al. | 382/173 |
| 2003/0081836 | A1 * | 5/2003 | Averbuch et al. | 382/199 |
| 2003/0185420 | A1 * | 10/2003 | Sefcik et al. | 382/103 |
| 2003/0218776 | A1 * | 11/2003 | Morimoto et al. | 358/2.1 |
| 2004/0167785 | A1 * | 8/2004 | Kimura et al. | 704/500 |
| 2005/0036658 | A1 * | 2/2005 | Gibbins et al. | 382/103 |
| 2005/0180635 | A1 * | 8/2005 | Trifonov et al. | 382/199 |
| 2005/0196069 | A1 * | 9/2005 | Yonaha | 382/282 |

(Continued)

FOREIGN PATENT DOCUMENTS

| JP | 11-213146 A | 8/1999 |
|---|---|---|
| JP | 2004-201240 A | 7/2004 |
| JP | 2006-065399 A | 3/2006 |
| JP | 2009-151445 A | 7/2009 |

OTHER PUBLICATIONS

Schmid, Cordelia, and Roger Mohr. "Local grayvalue invariants for image retrieval." Pattern Analysis and Machine Intelligence, IEEE Transactions on 19.5 (1997): 530-535.*

(Continued)

*Primary Examiner* — Stephen R Koziol
*Assistant Examiner* — Sean Conner
(74) *Attorney, Agent, or Firm* — Fitzpatrick, Cella, Harper & Scinto

(57) ABSTRACT

An information processing apparatus includes: a calculation unit adapted to analyze an image and calculate an intermediate value; a setting unit adapted to set a feature extraction region in the image, using the intermediate value; and an extraction unit adapted to extract a local feature of the feature extraction region, reusing the intermediate value used by the setting unit.

10 Claims, 6 Drawing Sheets

(56) References Cited

U.S. PATENT DOCUMENTS

| | | | |
|---|---|---|---|
| 2005/0213818 A1* | 9/2005 | Suzuki et al. | 382/190 |
| 2006/0088213 A1* | 4/2006 | Enomoto | 382/173 |
| 2006/0120627 A1* | 6/2006 | Shiiyama | 382/305 |
| 2006/0177125 A1* | 8/2006 | Chan et al. | 382/154 |
| 2006/0288394 A1* | 12/2006 | Thomas et al. | 725/112 |
| 2007/0286488 A1* | 12/2007 | Fukuda | 382/190 |
| 2008/0253661 A1 | 10/2008 | Ikeda | |
| 2009/0080777 A1* | 3/2009 | Amini et al. | 382/195 |
| 2009/0129635 A1* | 5/2009 | Abe | 382/115 |
| 2009/0129679 A1* | 5/2009 | Miyamoto | 382/190 |
| 2010/0098306 A1* | 4/2010 | Madabhushi et al. | 382/128 |
| 2010/0128927 A1* | 5/2010 | Ikenoue | 382/103 |
| 2010/0158392 A1* | 6/2010 | Adams et al. | 382/218 |
| 2010/0226532 A1* | 9/2010 | Hayasaka et al. | 382/103 |
| 2011/0141287 A1* | 6/2011 | Dunkel et al. | 348/169 |
| 2011/0229042 A1* | 9/2011 | Iwamoto et al. | 382/195 |
| 2011/0243443 A1* | 10/2011 | Varekamp | 382/173 |
| 2012/0207402 A1* | 8/2012 | Stojancic et al. | 382/260 |

OTHER PUBLICATIONS

Harris, Chris, and Mike Stephens. "A combined corner and edge detector." Alvey vision conference. vol. 15. 1988.*

Furuhata, et al., "SIFT Features Extraction in Selected Regions", Proceedings of the 70th National Convention of Information Processing Society of Japan, 2008.

Harris, et al., "A combined corner and edge detector", Alvey Vision Conference, pp. 147-152, 1988.

Schmid, et al., "Local Grayvalue Invariants for Image Retrieval", IEEE Transactions on Pattern Analysis and Machine Intelligence, vol. 19, No. 5, pp. 530-535, May 1997.

Lowe, "Distinctive Image Features from Scale-Invariant Keypoints", International Journal of Computer Vision, 60, pp. 91-110, 2004.

Ke, et al., "PCA-SIFT: A More Distinctive Representation for Local Image Descriptors", Proc. CVPR, 2004.

U.S. Appl. No. 12/768,559 filed Apr. 27, 2010. Applicant: Hirotaka Shiiyama, et al.

U.S. Appl. No. 12/778,953 filed May 12, 2010. Applicant: Hirotaka Shiiyama, et al.

U.S. Appl. No. 12/764,660 filed Apr. 21, 2010. Applicant: Koichi Magai, et al.

Japanese Office Action dated Sep. 13, 2013 in Japanese Patent Application No. 2009-254446.

* cited by examiner

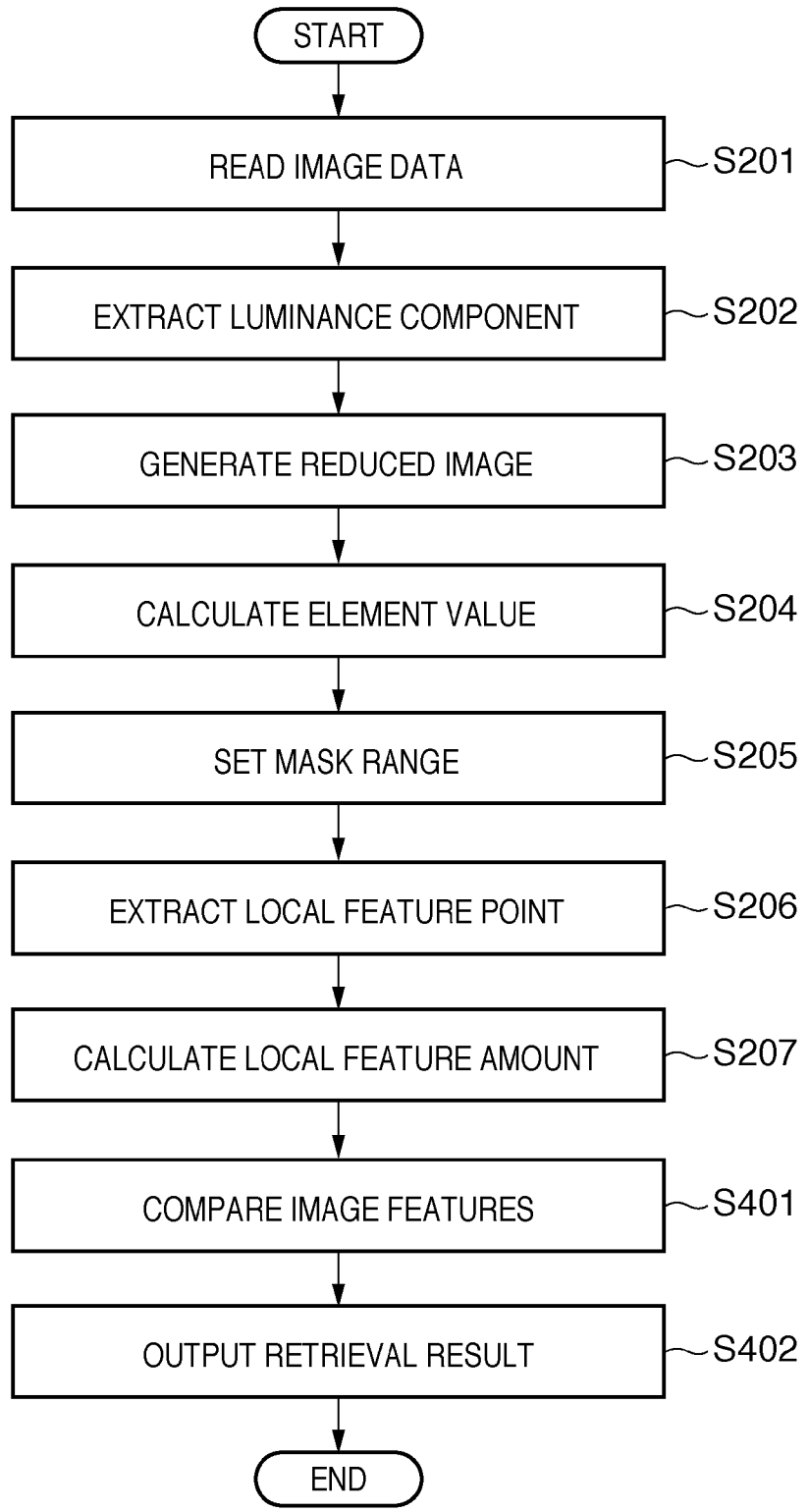

LOCAL FEATURE EXTRACTION APPARATUS, CONTROL METHOD THEREFOR, AND COMPUTER-READABLE MEDIUM

BACKGROUND OF THE INVENTION

1. Field of the Invention

The present invention relates to an information processing apparatus, a control method therefor, and a program, and in particular, relates to a technique for extracting a local feature from an image.

2. Description of the Related Art

The implementation of retrieval using a local feature amount that is obtained by converting a local feature of an image into a numerical value is known as a configuration for focusing attention on an object in an image and retrieving a similar image (Japanese Patent Laid-Open No. 2006-65399). With this configuration, firstly, various types of filters (such as Gauss, Sobel, and Prewitt) are applied to a two-dimensional luminance distribution of an image so as to extract a feature point in the image. Next, a feature amount (local feature amount) regarding the feature point is calculated, using the feature point and the pixel values of its neighboring pixels. Image retrieval is performed by matching the local feature amount between an image to be a query and an image targeted for retrieval. Image retrieval is realized with steady precision through such processing, even if the image has been rotated or reduced or includes a partial cutaway or a hidden part.

A technique using a background subtraction method for selecting a region in which a feature point and a local feature amount are calculated is also known (Shunichirou Furuhata, Itaru Kitahara, Yoshinari Kameda, and Yuichi Ohta, "SIFT Feature Extraction in Selected Regions," Proceedings of the 70th National Convention of Information Processing Society of Japan (2008); hereinafter referred to as "Furuhata et al."). With this technique, assuming that a fixed camera is used to capture a physical object, differences between a captured image and a pre-captured background image are obtained so as to specify a foreground region. The technique reduces calculation cost by using the specified foreground region as a mask region and calculating a feature point and a local feature amount only within the mask region.

With the configuration described in Japanese Patent Laid-Open No. 2006-65399, a local feature candidate is extracted from the entire image, irrespective of the presence or absence of an object in the image or the object type. In other words, processing entailing high calculation cost, such as convolution processing performed when applying filters, is performed uniformly even on a region that has less likelihood of a local feature being extracted. Such ineffective processing may cause a decrease in processing speed.

Meanwhile, although the technique of Furuhata et al. is capable of reducing the calculation cost, it is necessary with the technique to prepare a background image in advance. For this reason, the technique cannot be applied to general image retrieval where no background image is prepared. In addition, processing for setting a mask region and processing for calculating a feature point and a local feature amount are performed independently and separately. Thus, it is feared that the calculation cost might be increased rather than being reduced, for example in a case where the range of a foreground region is widened.

SUMMARY OF THE INVENTION

The present invention has been made in view of the problems described above and aims to provide a technique for improving the processing speed of image retrieval while maintaining high retrieval precision, irrespective of the image type.

According to one aspect of the present invention, an information processing apparatus includes: a calculation unit adapted to analyze an image and calculate an intermediate value; a setting unit adapted to set a feature extraction region in the image, using the intermediate value; and an extraction unit adapted to extract a local feature of the feature extraction region, reusing the intermediate value used by the setting unit.

According to another aspect of the present invention, a control method for an information processing apparatus, includes: a calculation step, performed by a calculation unit, of analyzing an image and calculating an intermediate value; a setting step, performed by a setting unit, of setting a feature extraction region in the image, using the intermediate value; and an extraction step, performed by an extraction unit, of extracting a local feature of the feature extraction region, reusing the intermediate value used in the setting step.

Further features of the present invention will become apparent from the following description of exemplary embodiments with reference to the attached drawings.

BRIEF DESCRIPTION OF THE DRAWINGS

FIG. 5 is a flowchart showing a procedure of processing for retrieving an image.

DESCRIPTION OF THE EMBODIMENTS

Hereinafter, embodiments according to the present invention will be described in detail with reference to the attached drawings.

Feature Point and Local Feature Amount

First is a description of a feature amount, a local feature point, and a local feature amount. In a case of specifying an image as a retrieval condition (query image) and retrieving a similar image, processing for comparing two images (the query image and an image in a database) is performed repeatedly. In the comparison of images, a numerical value or sequence that well represents the contents of an image is calculated in advance as a feature for each image. Then, images having similar features are determined as similar images and output as a retrieval result. Although a keyword indicating the contents of an image is sometimes used for image retrieval, a feature amount calculated from pixel values in an image is used for image retrieval and recognition in the present embodiment. Note that, in the specification of the invention, a feature of an image includes at least either a feature point of the image or a feature amount regarding the feature point of the image.

One example of such image retrieval is a technique for comparing a local feature included in a query image. With this technique, a point with which the correspondence between images is easily found is selected from an image and the correspondence of the point is found between images. Such a point with which the correspondence between images is easily found is referred to as a "local feature point" in the present embodiment. A configuration is adopted in which such a local feature point is extracted from the vicinity of corners or edges of an image whenever possible. When a local feature point is extracted, then a local region that centers on the local feature point is set. Using pixel values included in that region, a feature amount corresponding to each local feature point is calculated. The feature amount calculated in this way is referred to as a "local feature amount" in the present embodiment.

Functional Configuration

Figure 1A:
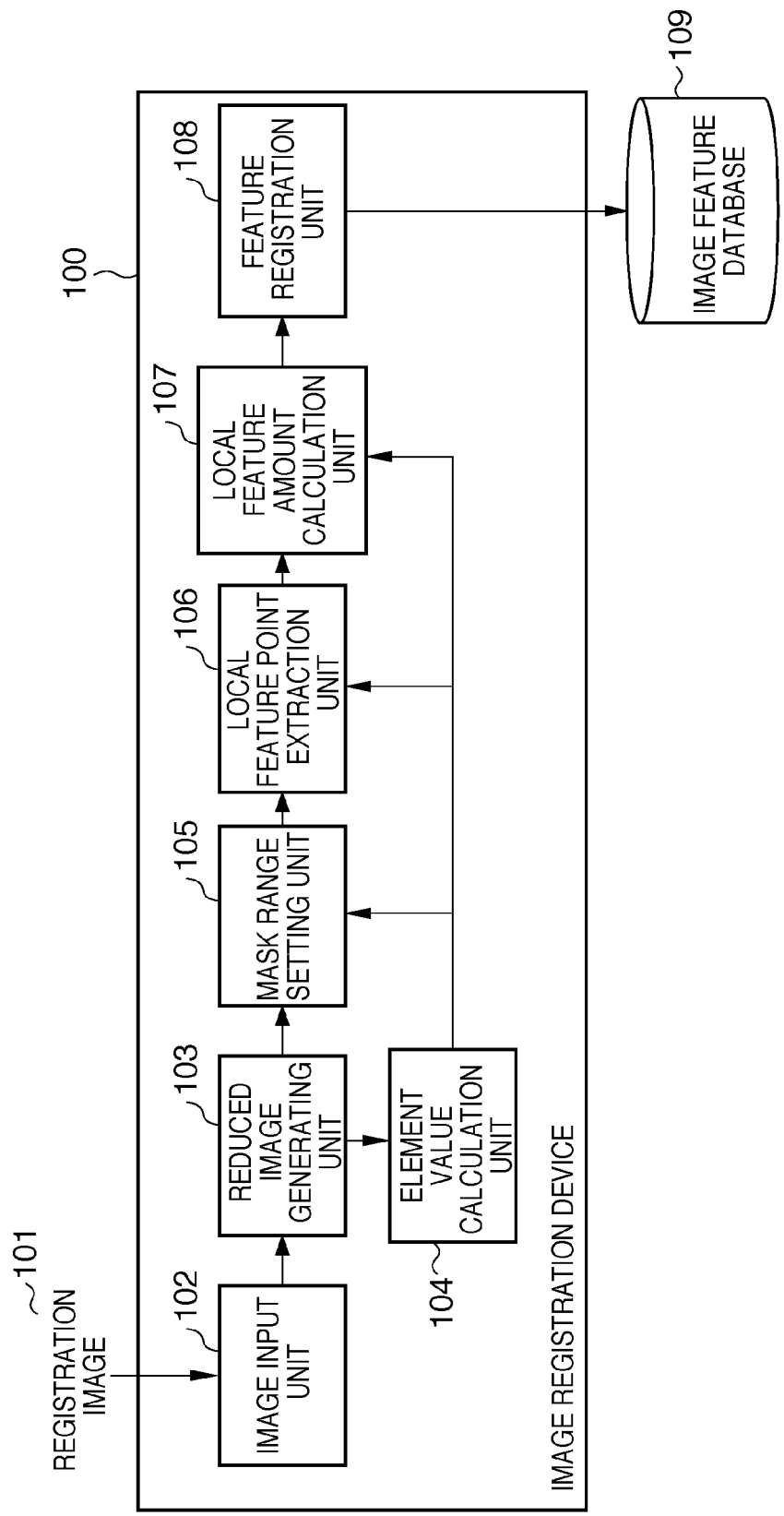
FIGS. 1A and 1B are block diagrams illustrating examples of the functional configuration of an information processing apparatus.
Figure 1B:
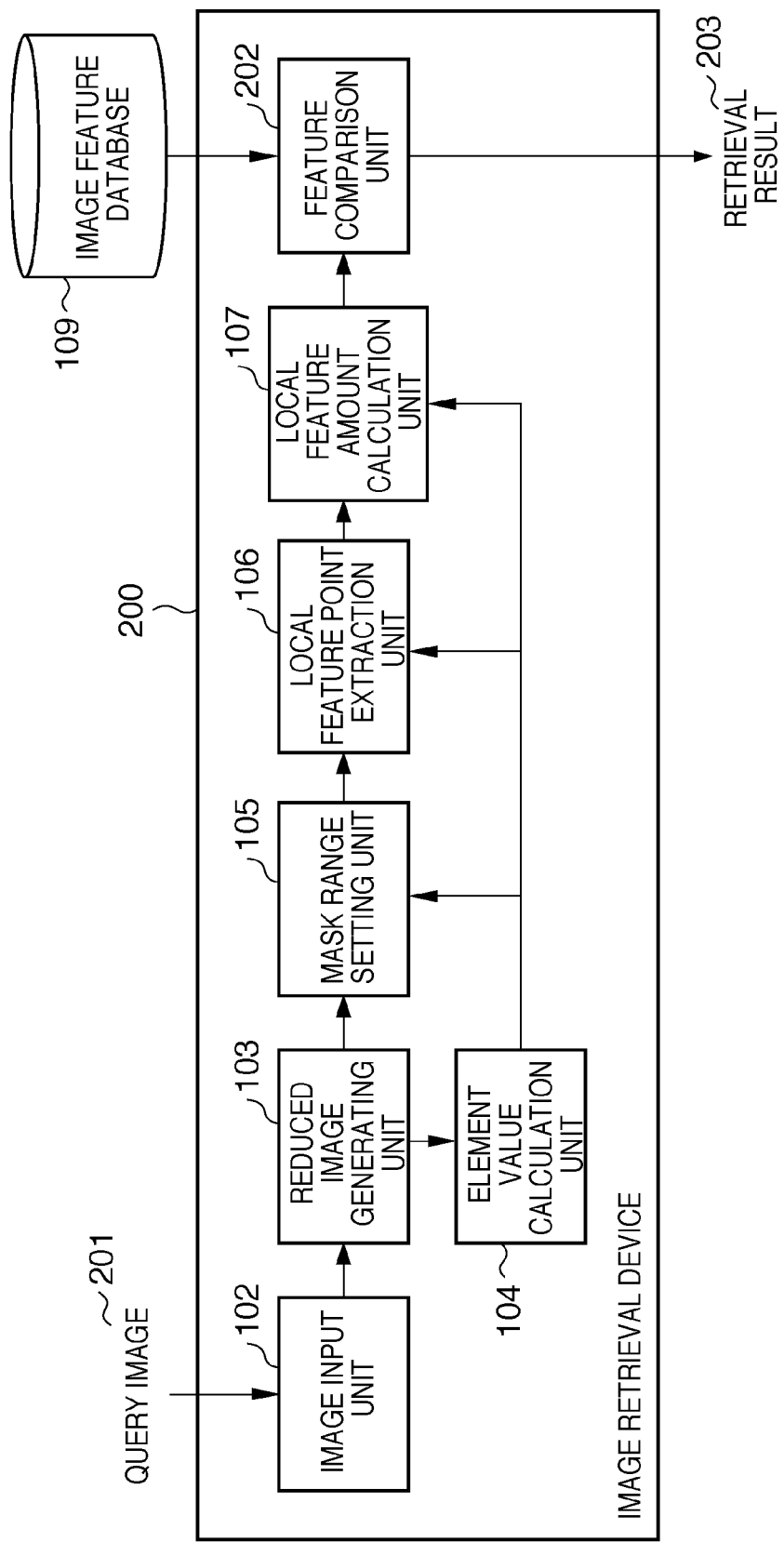

FIGS. 1A and 1B are block diagrams illustrating examples of the functional configuration of an apparatus according to the present embodiment. FIG. 1A shows a functional configuration of an image registration device 100, and FIG. 1B shows a functional configuration of an image retrieval device 200.

Image Registration Device

First is a description of the image registration device 100 shown in FIG. 1A. The image registration device 100 is an information processing apparatus that calculates a local feature amount of an input image and registers the calculated local feature amount in an image feature database 109. With the image registration device 100, a feature amount of an image targeted for retrieval of a similar image is registered in the database. As shown in FIG. 1A, the image registration device 100 includes an image input unit 102, a reduced image generation unit 103, an element value calculation unit 104, a mask range setting unit 105, a local feature point extraction unit 106, a local feature amount calculation unit 107, and a feature registration unit 108.

In the image registration device 100, the image input unit 102 is a functional component that receives an input of an image (registration image) for which a local feature amount is calculated. The reduced image generation unit 103 generates multiple reduced images having different reduction ratios from a registration image 101 received by the image input unit 102.

The element value calculation unit 104 calculates an element value (intermediate value) to be used by the downstream mask range setting unit 105 for each of the reduced images. The element value is reusable in at least either local feature point extraction processing performed by the local feature point extraction unit 106 or local feature amount calculation processing performed by the local feature amount calculation unit 107. Although an example where a luminance gradient amplitude is calculated as an element value in each pixel location in an input image will be described in the present embodiment, the invention is not intended to be limited thereto as will be described later in other embodiments. Of course, the element value may be reusable by both of the local feature point extraction unit 106 and the local feature amount calculation unit 107.

The mask range setting unit 105 sets a mask range in the registration image 101, using the element values. The local feature point extraction unit 106 performs processing for extracting a local feature point only within the mask range. If usable, the element values are used in the local feature point extraction processing.

The local feature amount calculation unit 107 calculates a local feature amount for each local feature point extracted by the local feature point extraction unit 106. If usable, the element values are used in the local feature amount calculation processing. The feature registration unit 108 registers information regarding the local feature points and information regarding the local feature amounts as an image feature of the registration image 101 in the image feature database 109. The details of the registration processing according to the present embodiment will be described later.

Image Retrieval Device

Next is a description of the image retrieval device 200 shown in FIG. 1B. The image retrieval device 200 is an information processing apparatus that retrieves an image similar to an image input as a query from among images whose local feature amounts have been registered in the image feature database 109. Specifically, the image retrieval device 200 retrieves an image similar to an input image from multiple registered images whose feature amounts have been registered in advance in the database. Here, components having the same functions as those of the image registration device 100 in FIG. 1A are denoted by the same reference numerals, and a description of those that are identical in configuration and function has been omitted. The image retrieval device 200 includes an image input unit 102 (that receives an input of an image to be a query), a reduced image generation unit 103, an element value calculation unit 104, a mask range setting unit 105, a local feature point extraction unit 106, a local feature amount calculation unit 107, and a feature comparison unit 202.

The feature comparison unit 202 as a comparison unit retrieves an image similar to a query image 201 from images whose local feature amounts have been registered in the image feature database 109, based on local feature amounts calculated by the local feature amount calculation unit 107, and outputs the retrieved image as a retrieval result 203. The details of the retrieval processing according to the present embodiment will be described later.

Hardware Structure

Figure 2:
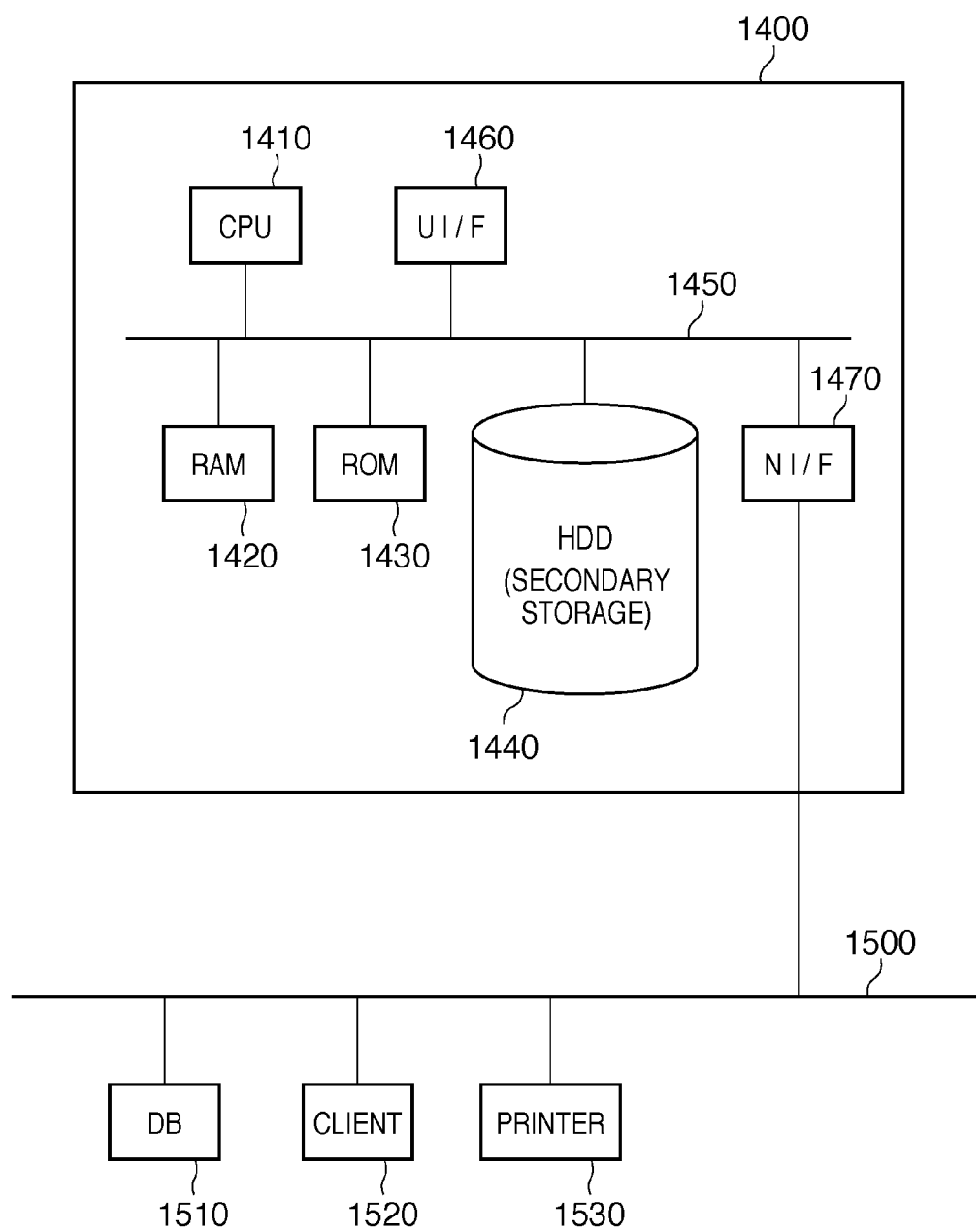
FIG. 2 is a diagram showing an example of an overview of a hardware structure of the information processing apparatus.

The image registration device 100 and the image retrieval device 200 described above are implemented by a computer (information processing apparatus) performing predetermined processing. The hardware structure of such a computer will be described with reference to FIG. 2. FIG. 2 is a block diagram showing an exemplary hardware structure of a computer. Note that, in the present embodiment, a storage medium having stored therein a program executed by a computer is supplied to a system or an apparatus, which causes the computer to execute the program.

A computer 1400 shown in FIG. 2 stores, in a ROM 1430, a program for causing a CPU 1410 to execute processing shown in the flowchart described later. At the time of execution of the program, the program stored in the ROM 1430 is read into a RAM 1420 so that the CPU 1410 can execute the program. The reference numeral 1450 indicates a bus, through which the ROM 1430, the RAM 1420, the CPU 1410, and an HDD 1440 exchange data among them.

The computer 1400 also receives an input from input and output equipment such as a keyboard or a mouse that is connected to a user interface. The computer 1400 inputs/outputs data from and to a network interface 1470, for example. The network interface 1470 of the computer 1400 enables communications with a database (DB) 1510, a client 1520, and a printer 1530 via a network 1500.

The computer 1400 may implement the processing according to the above-described embodiment in cooperation with multiple pieces of hardware and software. For example, parts of the configurations shown in FIGS. 1A and 1B can be implemented by software or can also be implemented by ICs that specialize in specific processing. As another alternative, the processing may be implemented by cooperation of multiple pieces of equipment connected to the network. By way of example with reference to FIG. 2, there is a configuration in which the computer 1400 receives an input of an image from the printer 1530 or the client 1520, performs the processing shown in the flowchart in FIG. 3, and registers the result in the database 1510. By way of another example, there is also another configuration in which the computer 1400 receives an input of a retrieval request and a query image from the client 1520 or the printer 1530, performs processing shown in the later-described flowchart in FIG. 5, and retrieves an image similar to the query image from the database 1510.

Registration Processing

Figure 3:
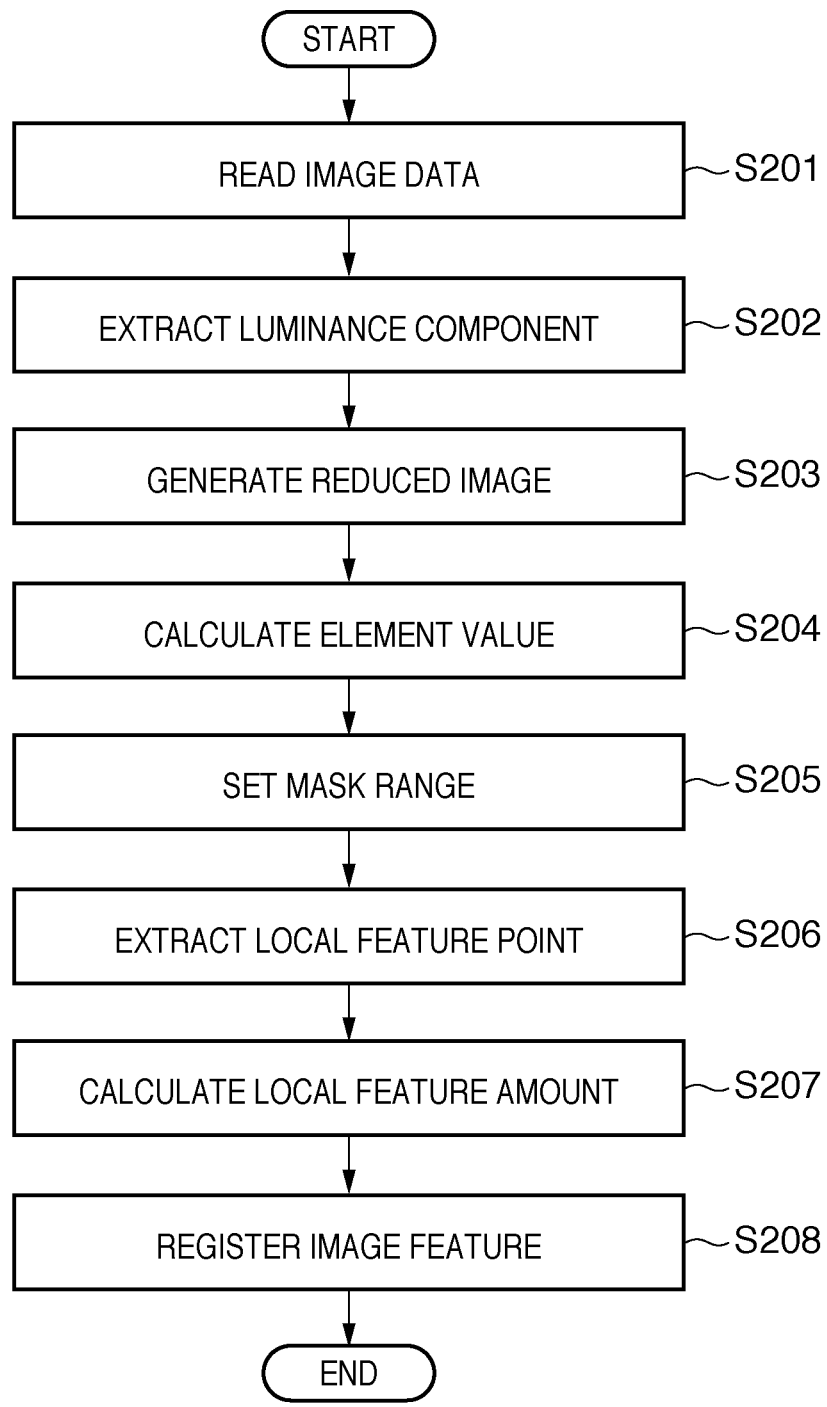
FIG. 3 is a flowchart showing a procedure of processing for registering an image.

Next is a detailed description of the processing performed in registering a local feature amount extracted from an image. FIG. 3 is a flowchart showing a procedure of the registration processing performed by the image registration device 100. Each step in FIG. 3 is implemented by the CPU 1410 controlling the processing that is performed by the computer 1400.

In S201, the image input unit 102 reads the registration image 101. In S202 to S204, processing for analyzing the input image and calculating an element value (intermediate value) is performed. In S202, the image input unit 102 extracts a luminance component from the registration image 101. Hereinafter, image data including such extracted luminance component is also referred to as a "luminance component image".

In S203, the reduced image generation unit 103 reduces and converts the luminance component extracted by the image input unit 102 and generates new luminance component images having n different resolutions. Specifically, for example, the reduced image generation unit 103 performs reduction processing n times in accordance with a predetermined reduction ratio p on the luminance component image acquired from the image input unit 102 and acquires n reduced images as a result (see FIG. 4). Here, although the reduction ratio p and the number of times n that an image is reduced have been determined in advance, the number n needs to be an integral number greater than or equal to 0. It is better to perform reduction and conversion multiple times. For example, the number of times required to reduce an image to 2×2 pixels may be computed and determined in advance.

Figure 4:
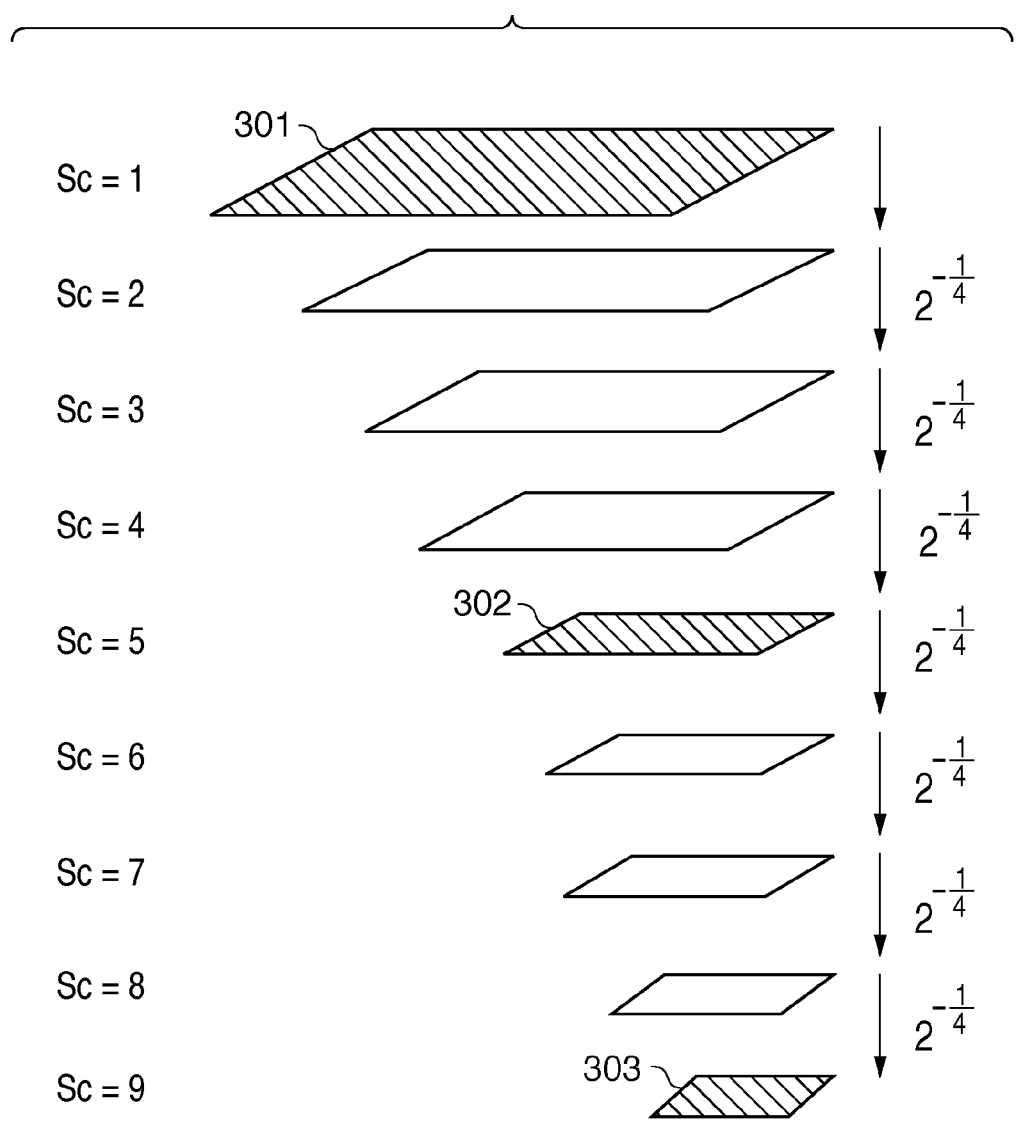
FIG. 4 is a schematic diagram illustrating processing for reducing and converting an image.

FIG. 4 is a diagram showing the reduction and conversion processing performed by the reduced image generation unit 103. FIG. 4 shows the case where the reduction ratio p is $2^{-1/4}$ and the number of reduced images n (=the number of times an image is reduced) is 8. Referring to FIG. 4, an image 301 is a luminance component image that is extracted from the input image 101 by the image input unit 102. An image 302 is a reduced image that is obtained by performing reduction processing four times on the luminance component image in accordance with the reduction ratio p. An image 303 is a reduced image that is obtained by performing reduction processing eight times on the luminance component image in accordance with the reduction ratio p. In the drawing, Sc indicates a scale number that has a one-to-one correspondence with the number of times n that an image is reduced (n=Sc−1).

In the present example, the image 302 is equivalent to an image obtained by reducing the luminance component image 301 from the image input unit 102 to ½ (=$p^4$), and the image 303 is equivalent to an image obtained by reducing the luminance component image to ¼ (=$p^8$).

Although, in the present embodiment, a description has been given on the assumption that an image is reduced and converted by linear interpolation, the invention is not intended to be limited thereto. For example, other techniques such as a technique for simply thinning out pixels or a technique for sampling pixels after application of a low pass filter may be used as a technique for reducing and converting an image.

Next, an element value (intermediate value) is calculated for each reduced image in S204. In the present embodiment, values obtained by the following equations (1) to (3) are calculated as element values. Here, on the right side of equation (1), G(x, y) denotes the Gaussian function, I(x, y) denotes the pixel value at the coordinate (x, y) in an image, and the symbol "*" represents convolution computation. Equation (1) gives a smoothed image. Equation (2) gives a partial derivative of a variable L defined by equation (1) with respect to x, and equation (3) gives a partial derivative of the variable L with respect to y. Equations (2) and (3) express luminance gradients in x and y directions, respectively. Here, G(x, y) denotes a predetermined Gaussian function that usually has a standard deviation σ as a variable, which however has been omitted from equation (1). In the present embodiment, it is predetermined that σ=a·r, where a is a constant and r is a radius of a circular region that centers on a local feature point, the region being referred to in downstream processing for calculating a local feature amount.

$$L = G(x, y) * I(x, y) \quad (1)$$

$$L_x = \frac{\partial L}{\partial x} \quad (2)$$

$$L_y = \frac{\partial L}{\partial y} \quad (3)$$

In step S205, a mask range is set using the element values. In the present embodiment, a mask is set in a pixel location where the following equation (4) is satisfied. Here, th is a predetermined threshold. Specifically, in the present embodiment, a mask is set in a pixel location where the luminance gradient amplitudes are greater than or equal to the threshold (th). Alternatively, other methods may be used, such as checking whether or not the sum of absolute values of the luminance gradients in the x and y directions is greater than or equal to a threshold. This could be considered setting edges and their neighboring pixels as a mask range.

$$\sqrt{L_x^2 + L_y^2} \geq th \quad (4)$$

In S206 and S207, a feature extraction region is selected in the input image, using the mask range, and a local feature is extracted, reusing the element values (intermediate values) used in setting the mask range. First, a local feature point is extracted in S206. The processing for extracting a local feature point is implemented by applying Harris operator (cf., C. Harris and M. Stephens, "A combined corner and edge detector," Alvey Vision Conference, pp. 147-152, 1988) to pixels in the mask range that has been set in S205.

More specifically, pixel values of a pixel H(x, y) and its eight neighboring pixels (a total of nine pixels) in an output image obtained by applying Harris operator are checked. Then, a point where the pixel value is a local maximum (that is, a pixel having a maximum pixel value from among the nine pixels) is extracted as a local feature point. However, even when the pixel value is a local maximum, if the pixel value is less than or equal to a predetermined threshold, the pixel value is determined as not being a robust and resistant local feature point and thus not extracted as a local feature point. Here, H(x, y) is calculated from the following equation (5). In equation (5), the symbol "*" represents convolution computation, k denotes a predetermined constant, and M denotes a matrix calculated from equation (6). Also, det(M) denotes a determinant of the matrix M, and trace(M) denotes a trace of the matrix M. In equation (6), $\sigma_h$ denotes a constant representing a predetermined standard deviation. $L_x$ and $L_y$ are values calculated from equations (2) and (3), respectively, for which the element values $L_x$ and $L_y$ calculated in S204 can be reused.

$$H(x, y) = \det(M) - k\, \text{trace}(M)^2 \qquad (5)$$

$$M = \exp(-(x^2 + y^2)/2\sigma_h^2) * \begin{bmatrix} L_x^2 & L_x L_y \\ L_x L_y & L_x^2 \end{bmatrix} \qquad (6)$$

In S207, a local feature amount is calculated for each local feature point extracted in S206. In the present embodiment, a local feature amount expressed by equation (7) is calculated, using a combination of a local jet, which is obtained by converting a pattern of a local feature point and its neighboring pixels into a numerical value, and its derivatives (cf., C. Schmid and R. Mohr "Local grayvalue invariants for image retrieval," IEEE Trans. PAMI., Vol. 19, No. 5, pp. 530-535, 1997). The symbols on the right side of equation (7) are defined by equations (1) to (3) and the following equations (8) to (10). Equation (8) gives a partial derivative of the variable $L_x$ defined by equation (2) with respect to x, and equation (9) gives a partial derivative of the variable $L_x$ defined by equation (2) with respect to y. Equation (10) gives a partial derivative of the variable $L_y$ defined by equation (3) with respect to y.

$$v = \begin{pmatrix} L \\ L_x L_x + L_y L_y \\ L_{xx} L_x L_x + 2 L_{xy} L_x L_y + L_{yy} L_y L_y \\ L_{xx} + L_{yy} \\ L_{xx} L_{xx} + 2 L_{xy} L_{xy} + L_{yy} L_{yy} \end{pmatrix} \qquad (7)$$

$$L_{xx} = \frac{\partial^2 L}{\partial x^2} \qquad (8)$$

$$L_{xy} = \frac{\partial^2 L}{\partial x \partial y} \qquad (9)$$

$$L_{yy} = \frac{\partial^2 L}{\partial y^2} \qquad (10)$$

In equation (7), $L_x$ and $L_y$ are values calculated from equations (2) and (3), respectively. For example, the element values $L_x$ and $L_y$ calculated in S204 can be reused as $L_x$ and L. Note that $L_{xx}$, $L_{xy}$, and $L_{yy}$ calculated from equations (8) to (10) may be calculated using equations (11) to (13), respectively. In this case, the element values $L_x$ and $L_y$ calculated in S204 can also be reused at the time of calculating $L_{xx}$, $L_{xy}$, and $L_{yy}$.

$$L_{xx} = \frac{\partial L_x}{\partial x} \qquad (11)$$

$$L_{xy} = \frac{\partial L_x}{\partial y} = \frac{\partial L_y}{\partial x} \qquad (12)$$

$$L_{yy} = \frac{\partial L_y}{\partial y} \qquad (13)$$

As described above, in the present embodiment, a local feature amount of an input image is calculated by reusing, as image data values, luminance gradient amplitudes that have been calculated as element values. This makes it possible to perform the processing with efficiency.

In step 208, information regarding local feature points and information regarding local feature amounts are registered in the image feature database 109 in association with the registration image 101 (such as image data and image identification information). In the present embodiment, the coordinates and scale numbers of local feature points are registered as the information regarding local feature points, and local feature amounts calculated using equation (7) are registered as the information regarding local feature amounts.

Retrieval Processing

Next is a description of operations performed by each unit in retrieving an image. FIG. 5 is a flowchart showing a procedure of the retrieval processing performed by the image retrieval device 200. Referring to FIG. 5, the same steps to perform the same function as those in FIG. 3 are denoted by the same reference numerals and a description of those that are functionally equivalent has been omitted. Each step in FIG. 5 is implemented by the CPU 1410 controlling the processing performed by the computer 1400.

In the retrieval processing, firstly, processing from S201 to S207 is performed on a query image so as to calculate a local feature amount. Then, in S401 and S402, the feature amount of the input image and the feature amount of each of multiple registered images are compared so as to retrieve an image similar to the input image.

In S401, the feature comparison unit 202 compares the local feature amount extracted from a query image 201 by the local feature amount calculation unit 107 with a local feature amount that has been registered in the image feature database 109. This comparison processing is performed for each input image that has been registered in the image feature database 109, so as to calculate similarity for each input image as a result of the comparison processing.

Next, a retrieval result 203 is output in S402. The retrieval result 203 to be output may, for example, be a result obtained by associating similarity calculated in step 401 with an image from which the similarity has been calculated and sorting such associations in descending order of similarity. Alternatively, thumbnails of images may also be output additionally as a retrieval result.

Similarity Calculation Method

Next is a description of a similarity calculation method according to the present embodiment. To simplify the description, assuming that Q is a query image and S is a comparison target image retrieved from an image database, a technique for calculating similarity between Q and S (similarity calculation method) will be described in detail.

The query image Q includes $q_n$ local feature amounts, and the i-th local feature amount is given by $V_q(i)$. The comparison target image S includes $s_n$ local feature amounts, and the j-th local feature amount is given by $V_s(j)$.

First, the Euclidean distance d_ij between vectors is obtained for every combination of $V_q(i)$ and $V_s(j)$. When the Euclidean distance d_ij is less than or equal to a predetermined threshold, the comparison target image S gets a vote. The number of votes after the voting for the comparison target image S is completed for all combinations of $V_q(i)$ and $V_s(j)$ is given by Vote(S). In this case, similarity Sim_QS of the query image Q to the comparison target image S is calculated from the following equation (14).

$$\text{Sim\_QS} = \text{Vote}(S)/q_n \qquad (14)$$

Although the Euclidean distance is used as the distance between vectors in the present embodiment, other distances such as the Mahalanobis distance may be adopted as long as the distance is correlated with vector variation. Incidentally, the use of the distance between vectors is not an absolute necessity in calculating similarity, and other amounts may be used as long as the amount is correlated with vector variation. For example, a similarity calculation method based on the angle between vectors may be adopted. In this case, it is necessary to define an equation such that similarity increases as the angle between vectors decreases.

With the configuration as described above in the present embodiment, a value that is reused in downstream feature point extraction processing or feature amount calculation processing is calculated as an element value, and a processing target region is selected using the element value. This enables improving processing speed while maintaining retrieval precision. In other words, in the present embodiment, an intermediate value (element value) that has been used in setting a mask range in an input image is reused in extracting a local feature from the input image, which enables achieving both high retrieval precision and high processing speed.

Also, although the example where the luminance gradient amplitude is calculated as an intermediate value has been described in the present embodiment, the overall calculation cost can be kept low because the luminance gradient amplitude can be calculated through relatively simple computations as described above.

Although the technique using Harris operator as the method for extracting a local feature point in S206 has been described in the above embodiment, other local feature point extraction methods may be used as long as the method allows stable extraction of a local feature point even after image processing such as image rotation or reduction. Examples of other techniques include a local feature point extraction method using Difference of Gaussian (DOG) (cf., David G. Lowe, "Distinctive Image Features from Scale-Invariant Keypoints," International Journal of Computer Vision, 60, 2 (2004), pp. 91-110; hereinafter referred to as "David et al.").

Also, although the combination of the local jet and its derivatives as expressed by equation (7) is used for calculation in the method for calculating a local feature amount in S207, the present invention is not intended to be limited to such a calculation method. It is sufficient that a local feature amount with little variation can be calculated even after image processing such as image rotation or reduction, and examples of other usable techniques include a technique using a SIFT feature amount (David et al.) and a technique using a PCA-SIFT feature amount (Y. Ke and R. Sukthankar, "PCA-SIFT: A More Distinctive Representation for Local Image Descriptors," Proc. CVPR, 2004). As another alternative, a feature amount may be configured from a combination of coefficients obtained after frequency conversion such as Fourier transform.

However, in the case of applying techniques other than the technique described in the above embodiment, it is suitable that an element value calculated in S204 is reusable in either or both of S206 and S207. It is further suitable that the element value is usable in setting an effective mask range in S205.

For example, in the case of using DOG in extracting a local feature point in S206, the value L calculated from equation (1) as an element value in S204 is reusable. Also, in the case of using a SIFT feature amount or PCA-SIFT feature amount in calculating a local feature amount in S207, the values $L_x$ and $L_y$ calculated from equations (2) and (3) as element values in S204 are reusable. In either case, the same mask-range setting method as the technique described in the above embodiment can be used in S205. Alternatively, a configuration can be adopted in which a local feature amount is calculated from a combination of coefficients obtained after frequency conversion such as Fourier transform. In this case, an element value calculated in S204 is used as a frequency efficient, and the mask-range setting condition in S205 is defined, for example, such that a peak frequency coefficient in a frequency-converted input image is greater than or equal to a predetermined frequency (predetermined threshold). This enables eliminating an image region including a small number of edge components from the processing region in S206, thus making an element value reusable in calculating a local feature amount.

As described above, it is sufficient that an element value calculated in S204 is reusable in at least either S206 or S207, and using such an element value, an effective mask range can be set in S205. If this condition is satisfied, in addition to the example described above, color information may also be used to calculate an element value and set a mask range.

Also, although the example where the information registered in S208 includes the coordinate and scale number of a local feature point and a local feature amount calculated using equation (7) has been described, the registration information is not intended to be limited thereto. For example, a configuration is adopted in which local feature amounts are clustered using, for example, the k-means method before registration, and a cluster number may be registered as an index. Such index registration can speed up the retrieval processing.

As described above, by calculating, as an element value, a value to be used in downstream feature point extraction or feature amount calculation processing and selecting a processing target region using the element value, it is possible to improve the processing speed while maintaining retrieval precision.

Although, in the above embodiment, a mask is set in S205 in a pixel location where the luminance gradient amplitude is greater than or equal to a predetermined threshold th, a mask range may further be expanded. The method for expanding a mask range is not particularly limited, and it may be implemented by line thickening processing, for example. By further expanding the mask range in this way, a greater number of local feature points can be extracted. This allows retrieval precision to be more reliably maintained while improving the processing speed.

Also, in S205, for example when the area of the mask range is greater than or equal to a predetermined size, the processing for setting a mask range may be stopped and the mask range may be set to a full screen. Specifically, after the processing for setting a mask range has started, the area of the already-set mask range is measured and if the area is larger than or equal to a predetermined value, the processing is stopped and the mask range is set to the entire input image region. In this case, the mask range is set to the entire input image region and the procedure proceeds to the next processing. Such a configuration prevents the processing for setting a mask range from becoming a cause of an increase in calculation cost, thus improving processing speed while maintaining retrieval precision throughout the entirety of processing.

Similarly, instead of setting a mask in every pixel location where the luminance gradient amplitude is greater than or equal to a threshold th, in a case where the processing time for setting a mask range has reached or exceeded a predetermined period of time, the processing for setting a mask range may be stopped and the procedure may proceed to the next processing after setting the mask range to a full screen. That is, in a case where a predetermined period of time has elapsed after the processing for setting a mask range has started and before the processing is completed, the mask range may be set to an entire input image region. This also prevents the processing for setting a mask range from becoming a cause of an increase in calculation cost, thus improving the processing speed while maintaining retrieval precision throughout the entirety of processing.

Also, although the processing for setting a mask range in S205 is usually performed in the order of scanning the screen, that is, from the upper right of the screen to the lower left, the processing may be performed randomly. In this case, an input image is divided into multiple partial regions, those partial regions are selected in random order, and a mask range is set to a region within a certain range from edge portions for each of the partial regions in the order in which they were selected. Accordingly, for example in the case where an image is processed in which the upper half of the screen is the sky and the lower half is grassland, an increase in the calculation cost entailed in the mask setting process can be detected at an earlier stage than in the case where the mask setting process is performed in the order of scanning. With a combination of such processing and the processing for stopping the mask setting process as described above, it is possible to prevent the processing for setting a mask range from becoming a cause of an increase in calculation cost and thereby improve the processing speed while maintaining retrieval precision throughout the entirety of processing.

As another alternative, the processing for setting a mask range in S205 may be performed not in the order of scanning the screen, that is, from the upper right of the screen to the lower left, but in the reverse order of scanning, that is, from the lower left to the upper right. Even with such a configuration, for example in the case where an image is processed in which the upper half of the screen is the sky and the lower half is grassland, an increase in the calculation cost entailed in the mask setting process can be detected at an earlier stage. With a combination of such a configuration and the processing for stopping the mask setting process as described above, it is possible to prevent the processing for setting a mask range from becoming a cause of an increase in calculation cost and thereby improve the processing speed while maintaining retrieval precision throughout the entirety of processing.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

According to the present invention, it is possible to provide a technique for improving the processing speed of image retrieval while maintaining retrieval precision, regardless of the image type.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-254446, filed on Nov. 5, 2009, which is hereby incorporated by reference herein in its entirety.

What is claimed is:

1. An information processing apparatus comprising:
an obtaining unit configured to analyze an image and obtain an intermediate value;
a setting unit configured to set a feature extraction region in the image, using the intermediate value, wherein an area of the feature extraction region gradually expands after processing for setting the feature extraction region has started and until the processing has been completed;
an extraction unit configured to extract a feature point from the feature extraction region, by reusing the intermediate value used by the setting unit; and
an acquisition unit configured to acquire a local image feature amount of the feature point, by reusing the intermediate value used by the setting unit,
wherein, after the processing for setting the feature extraction region has started, the setting unit measures the area of the feature extraction region and, when the area is greater than or equal to a predetermined value, stops the processing and sets the feature extraction region to the entire image.

2. The information processing apparatus according to claim 1, wherein the obtaining unit obtains a luminance gradient value for each pixel location in the image.

3. The information processing apparatus according to claim 2, wherein the setting unit sets the feature extraction region to a region where the luminance gradient value is greater than or equal to a predetermined threshold.

4. The information processing apparatus according to claim 1, wherein the obtaining unit performs frequency conversion on the image and obtains a peak frequency coefficient in an image obtained by the frequency conversion as the intermediate value.

5. The information processing apparatus according to claim 4, wherein the setting unit sets the feature extraction region to a region where the peak frequency coefficient is greater than or equal to a predetermined threshold.

6. The information processing apparatus according to claim 1, wherein the setting unit divides the image into a plurality of partial regions, selects the partial regions in random order, and sets the feature extraction region for each of the partial regions in the order of selection.

7. The information processing apparatus according to claim 1, further comprising:
a holding unit configured to hold each local image feature amount acquired by the acquisition unit in association with the image.

8. The information processing apparatus according to claim 1, wherein
the image is an input image,
the information processing apparatus further comprising:
a retrieval unit configured to retrieve an image similar to the input image by comparing a local image feature amount of the input image with a local image feature amount of each image held in a holding unit.

9. A control method for an information processing apparatus, comprising:
an obtaining step, performed by an obtaining unit, of analyzing an image and obtaining an intermediate value;
a setting step, performed by a setting unit, of setting a feature extraction region in the image, using the intermediate value, wherein an area of the feature extraction region gradually expands after processing for setting the feature extraction region has started and until the processing has been completed; and an extraction step, performed by an extraction unit, of extracting a feature point from the feature extraction region, by reusing the intermediate value used in the setting step;

an acquisition step, performed by an acquisition unit, of acquiring a local image feature amount of the feature point, by reusing the intermediate value used in the setting step, wherein, after the processing for setting the feature extraction region has started, the setting step measures the area of the extraction region and, when the area is greater than or equal to a predetermined value, stops the processing and sets the feature extraction region to the entire image.

10. A non-transitory computer-readable storage medium having stored thereon a program for causing a computer to serve as each unit of the information processing apparatus according to claim 1.

* * * * *